Patented Aug. 23, 1932

1,873,072

UNITED STATES PATENT OFFICE

DONALD K. TRESSLER, OF PITTSBURGH, PENNSYLVANIA, ASSIGNOR TO THE MATHIESON ALKALI WORKS, INC., OF NEW YORK, N. Y., A CORPORATION OF VIRGINIA

CHLORHYDRINS OF ALIPHATIC KETONES AND PROCESS OF PREPARING THE SAME

No Drawing.     Application filed December 4, 1929.   Serial No. 411,699.

This invention relates to new chlorhydrins of aliphatic ketones and includes both the new products and the method of preparing them.

I have found that the unsaturated aliphatic ketones will react with hypochlorous acid to form chlorhydrins thereof. The resulting chlorhydrins are new products and are valuable intermediates, for example, for the production of wax-like products by condensation with soaps as set forth in my companion application Serial Number 411,700 filed of even date herewith.

The new chlorhydrins of the unsaturated aliphatic ketones can readily be prepared by treating these unsaturated ketones with a cold solution of hypochlorous acid, and I have observed that a nearly quantitative yield is obtainable if the temperature of the reaction is kept low, e. g., below 10° C.

Unsaturated aliphatic Ketones, such as, for example, oleone, can thus be converted into chlorhydrins.

The invention will be further illustrated by the following specific example, but it will be understood that the invention is not limited thereto. The parts are by weight.

100 parts of the ketone, oleone, were dissolved in 200 parts of ethyl ether. The solution was placed in a refrigerated container and treated with portions of 100 parts each of a 1.5 per cent. hypochlorous acid solution, with agitation of the mixture with a mechanical stirrer and allowing the solution to cool between additions. After a total of 700 parts of the hypochlorous acid solution had been added, agitation was continued for about one hour and then the mixture was allowed to stand overnight. The ethereal solution was then separated from the aqueous layer and the aqueous layer was then subjected to extraction with ethyl ether. The two lots of oleone chlorhydrin were combined and dried using anhydrous sodium sulfate. Upon distillation of the ether, about 117 parts of oleone chlorhydrin containing 11.2 per cent. of chlorine (11.7 per cent. chlorine is the theoretical figure) were obtained.

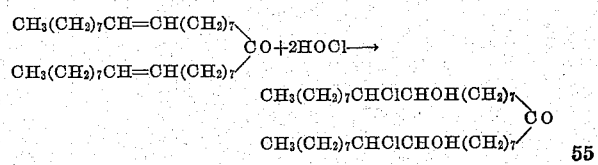

The unsaturated ketones described in my companion application Serial Number 385,089, filed August 10th, 1929, can be treated similarly to form corresponding chlorhydrins.

The unsaturated aliphatic ketones may be treated directly, or in solution in a solvent, such as ethyl ether, which will not react with hypochlorous acid.

Since the commercial fatty oils containing unsaturated glycerides yield, upon saponification, mixtures of various unsaturated and saturated fatty acids, mixed ketones may be obtained from these acids and the corresponding chlorhydrins may be prepared by treatment of these ketones with hypochlorous acid, as described above.

The new chlorhydrins form valuable intermediates for use in the production of new wax-like products by condensing them with soaps, as set forth in my said companion application.

I claim:

1. As new products, chlorhydrins of unsaturated aliphatic ketones.

2. The method of producing chlorhydrins of unsaturated aliphatic ketones which comprises treating such ketones with a cold solution of hypochlorous acid.

3. The method of producing chlorhydrins of unsaturated aliphatic ketones which comprises treating the same with a cold aqueous solution of hypochlorous acid while maintaining the mixture at a low temperature the hypochlorous acid solution being added in successive portions with agitation and cooling.

In testimony whereof I affix my signature.

DONALD K. TRESSLER.